United States Patent
Amano et al.

(10) Patent No.: US 12,283,141 B2
(45) Date of Patent: Apr. 22, 2025

(54) INFORMATION PROCESSING APPARATUS AND METHOD FOR ESTIMATING A DEGRADATION DEGREE BASED ON OBTAINED HISTORY INFORMATION

(71) Applicant: HONDA MOTOR CO., LTD., Tokyo (JP)

(72) Inventors: Masaki Amano, Saitama (JP); Syouji Inose, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 603 days.

(21) Appl. No.: 17/569,529

(22) Filed: Jan. 6, 2022

(65) Prior Publication Data

US 2022/0219706 A1 Jul. 14, 2022

(30) Foreign Application Priority Data

Jan. 12, 2021 (JP) .................................. 2021-002667

(51) Int. Cl.
 G07C 5/08 (2006.01)
 B60W 40/09 (2012.01)
 G06Q 20/40 (2012.01)
 B62D 15/02 (2006.01)

(52) U.S. Cl.
 CPC ........... *G07C 5/0816* (2013.01); *B60W 40/09* (2013.01); *G06Q 20/401* (2013.01); *B62D 15/021* (2013.01)

(58) Field of Classification Search
 USPC ...................................................... 702/127
 See application file for complete search history.

(56) References Cited

U.S. PATENT DOCUMENTS

| 2014/0019001 | A1 | 1/2014 | Nishizawa |
| 2014/0058956 | A1* | 2/2014 | Raines ............... G06Q 30/0201 705/306 |
| 2016/0155056 | A1 | 6/2016 | Shiozaki |
| 2018/0222343 | A1 | 8/2018 | Uchida |

(Continued)

FOREIGN PATENT DOCUMENTS

| CN | 107122831 A | 9/2017 |
| CN | 111784089 A | 10/2020 |

(Continued)

OTHER PUBLICATIONS

Office Action issued for counterpart Chinese Application 202111542661.3, issued by The State Intellectual Property Office of People's Republic of China on May 11, 2024.

(Continued)

*Primary Examiner* — Paul D Lee

(57) ABSTRACT

An information processing apparatus includes a history obtaining unit configured to obtain at least one of movement history information indicating a movement history of each of one or more movable objects and use history information indicating a use history of each of one or more parts installed in any of the one or more movable objects, and a degradation estimation unit configured to estimate a degradation degree of each of the one or more parts based on at least one of the movement history indicated by the movement history information obtained by the history obtaining unit and the use history indicated by the use history information obtained by the history obtaining unit.

14 Claims, 10 Drawing Sheets

(56) References Cited

U.S. PATENT DOCUMENTS

| | | | |
|---|---|---|---|
| 2019/0392381 A1* | 12/2019 | Simmons | G06Q 10/087 |
| 2020/0159199 A1* | 5/2020 | Osumi | G05B 23/0232 |
| 2020/0160348 A1* | 5/2020 | Osumi | G06Q 30/0278 |
| 2020/0326382 A1 | 10/2020 | Matsumura | |
| 2021/0118018 A1 | 4/2021 | Shibata | |
| 2021/0339653 A1 | 11/2021 | Yamamoto | |

FOREIGN PATENT DOCUMENTS

| | | |
|---|---|---|
| JP | H06255428 A | 9/1994 |
| JP | 2002109148 A | 4/2002 |
| JP | 2002312466 A | 10/2002 |
| JP | 2004240534 A | 8/2004 |
| JP | 2005050022 A | 2/2005 |
| JP | 2006197765 A | 7/2006 |
| JP | 2008262524 A | 10/2008 |
| JP | 2018128769 A | 8/2018 |
| JP | 2020038522 A | 3/2020 |
| JP | 2020097342 A | 6/2020 |
| JP | 2020113507 A | 7/2020 |
| KR | 20010035145 A | 5/2001 |
| KR | 20050072186 A | 7/2005 |
| KR | 20200089567 A | 7/2020 |
| WO | 2012133212 A1 | 10/2012 |
| WO | 2019131825 A1 | 7/2019 |
| WO | 2020009167 A1 | 1/2020 |

OTHER PUBLICATIONS

Office Action issued for counterpart Japanese Application No. 2021-002667, issued by the Japanese Patent Office on Sep. 6, 2022 (drafted on Aug. 29, 2022).

* cited by examiner

300

| PART ID | PARENT PART ID | PART NAME | SPECIFI-CATION | VEHICLE ID | OWNER ID | SELLING INTENTION | DESIRED SELLING PRICE |
|---|---|---|---|---|---|---|---|
| LP_001 | none | FRONT SEAT | **** | V_120 | U_022 | PARTIALLY PRESENT | **** |
| MP_001 | LP_001 | HEADREST | **** | V_120 | U_022 | PRESENT | **** |
| MP_002 | LP_001 | SEAT MAIN BODY | **** | V_120 | U_022 | PARTIALLY PRESENT | **** |
| MP_003 | LP_001 | ATTACHMENT \ BRACKET | **** | V_120 | U_022 | UNKNOWN | **** |
| SP_001 | MP_002 | FRAME | **** | V_120 | U_022 | ABSENT | **** |
| SP_002 | MP_002 | PAD | **** | V_120 | U_022 | ABSENT | **** |
| SP_003 | MP_002 | COVER | **** | V_120 | U_022 | PRESENT | **** |
| : | : | : | : | : | : | : | : |

*FIG.3*

| 422 | 424 | 426 | | 432 | 434 | 436 |
|---|---|---|---|---|---|---|
| PART ID | DATE AND TIME | USE HISTORY | | DEGRA- DATION DEGREE | SALEABLE PRICE | ALTERNATIVE PART |
| | | ITEM PA | ITEM PZ | | | |

| VEHICLE ID | DATE AND TIME | MOVEMENT HISTORY | | |
|---|---|---|---|---|
| | | ITEM VA | ... | ITEM VZ |

INFORMATION PROCESSING APPARATUS AND METHOD FOR ESTIMATING A DEGRADATION DEGREE BASED ON OBTAINED HISTORY INFORMATION

The contents of the following Japanese patent application are incorporated herein by reference:
2021-002667 filed in JP on Jan. 12, 2021.

BACKGROUND

1. Technical Field

The present invention relates to an information processing apparatus, a computer readable medium, and an information processing method.

2. Related Art

Patent Document 1 discloses a battery reuse assistance system capable of efficiently assisting battery reuse by determining a purpose of a battery.

CITATION LIST

Patent Document

Patent document 1: Japanese Patent Application Publication No. 2020-038522

The summary clause does not necessarily describe all necessary features of the embodiments of the present invention. The present invention may also be a sub-combination of the features described above.

BRIEF DESCRIPTION OF THE DRAWINGS

FIG. 3 schematically illustrates one example of a data structure of a data table 300.

FIG. 4 schematically illustrates one example of a data structure of a data table 400.

FIG. 5 schematically illustrates one example of a data structure of a data table 500.

DESCRIPTION OF EXEMPLARY EMBODIMENTS

Figure 1:
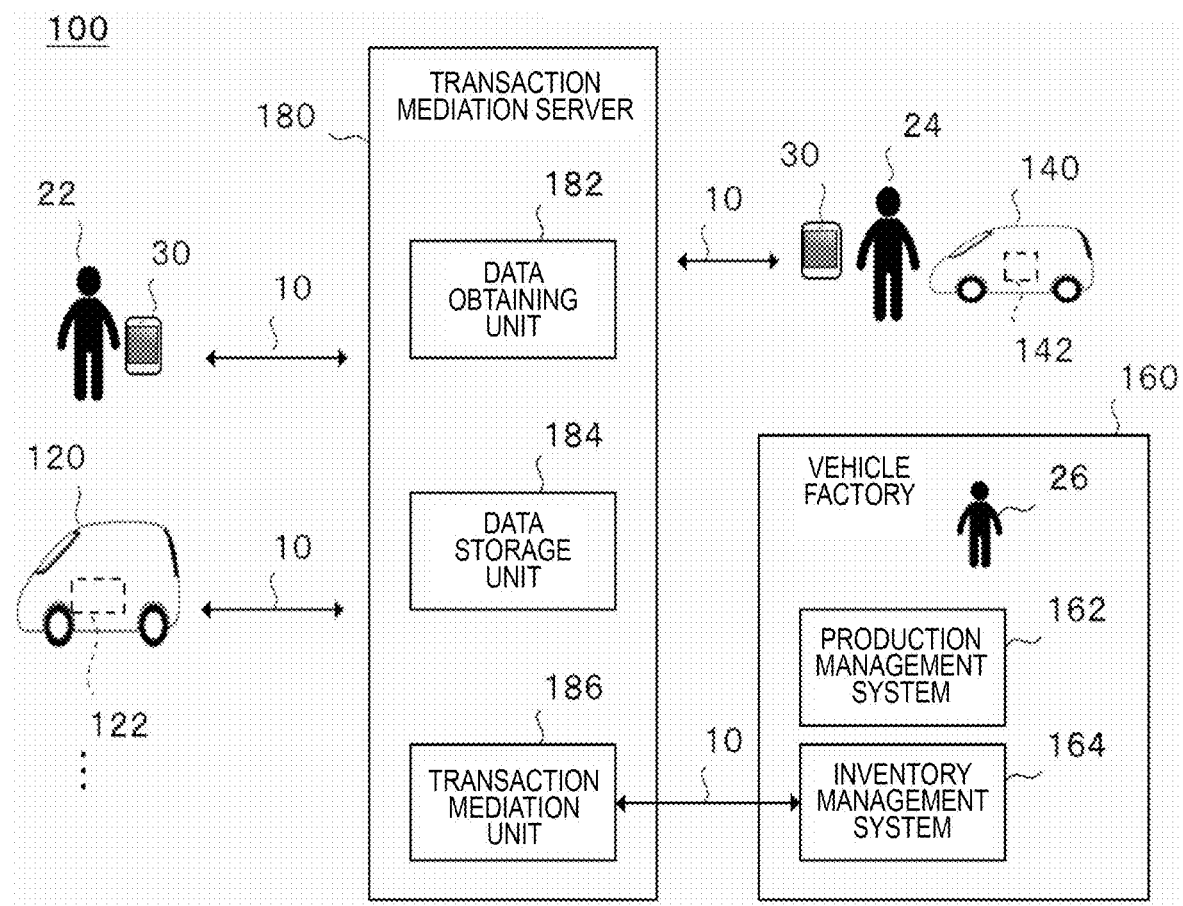
FIG. 1 schematically illustrates one example of a system configuration of a transaction mediation system 100.

Hereinafter, the present invention will be described by way of exemplary embodiments of the invention, but the following embodiments are not intended to restrict the invention according to the claims. In addition, not all combinations of features described according to the embodiments necessarily have to be essential to solving means of the invention. It should be noted that the same or similar parts in the drawings are assigned with the same reference numerals, and the duplicated explanation may be omitted.

[Outline of Transaction Mediation System 100]

FIG. 1 schematically illustrates one example of a system configuration of a transaction mediation system 100. According to the present embodiment, the transaction mediation system 100 includes a transaction mediation server 180. According to the present embodiment, a detail of the transaction mediation system 100 will be described while a case is used as an example where the transaction mediation server 180 is to mediate a used part transaction between an owner 22 of each of one or more vehicles 120 and at least one of an owner 24 of a vehicle 140 and an administrator 26 of a vehicle factory 160.

According to the present embodiment, the detail of the transaction mediation system 100 will be described while a case is used as an example where, to replace a part 142 of the vehicle 140, the owner 24 of the vehicle 140 procures a used part replaceable for the part 142 by utilizing the transaction mediation server 180. In addition, according to the present embodiment, the detail of the transaction mediation system 100 will be described while a case is used as an example where the vehicle factory 160 is to produce a new vehicle (which may be referred to as a reproduced vehicle, a quasi-new vehicle, or the like) by reusing used parts taken out from a plurality of vehicles. The administrator 26 of the vehicle factory 160 procures a used part that is a raw material of the reproduced vehicle by utilizing the transaction mediation server 180, for example.

According to the present embodiment, the vehicle 120 has a plurality of parts 122. According to the present embodiment, the vehicle 140 has a plurality of parts 142. According to the present embodiment, the vehicle factory 160 includes a production management system 162 and an inventory management system 164. According to the present embodiment, the transaction mediation server 180 has a data obtaining unit 182, a data storage unit 184, and a transaction mediation unit 186.

According to the present embodiment, a communication terminal 30 and the transaction mediation server 180 can transmit and receive information with each other via a communication network 10. According to the present embodiment, the vehicle 120 and the transaction mediation server 180 can transmit and receive information with each other via the communication network 10. According to the present embodiment, the inventory management system 164 and the transaction mediation server 180 can transmit and receive information with each other via the communication network 10.

When a used part is to be traded, it is not easy for the owner 24 or the administrator 26 to sufficiently grasp a state of the used part before the transaction is concluded. For this reason, for example, even when the owner 24 or the administrator 26 searches for the used part using a desired buying price as a key by utilizing a database of used parts, it is not necessarily the case where a part appropriate to a price is extracted.

In addition, when the owner 24 or the administrator 26 desires to acquire transfer of a part that is not on sale as the used part, the owner 24 or the administrator 26 advertises for a transferor of the part, and waits for a response from the transferor. For this reason, it is difficult for the owner 24 or the administrator 26 to acquire the part at a desired time.

In view of the above, in accordance with the transaction mediation system 100 according to the present embodiment, first, the transaction mediation server 180 is configured to obtain at least one of movement history information indicating a movement history of each of the one or more vehicles 120, and use history information indicating a use history of each of the one or more parts 122 installed in any of the one or more vehicles 120. The transaction mediation server 180 is configured to obtain at least one of the movement history information and the use history information via the communication network 10 from each of the one or more vehicles 120, for example.

Next, the transaction mediation server 180 is configured to estimate a degradation degree of each of the one or more parts 122 based on at least one of the movement history indicated by the above described movement history information and the use history indicated by the above described use history information. The transaction mediation server 180 may estimate a remaining life of each of the parts as the degradation degree of each of the parts. In addition, the transaction mediation server 180 is configured to predict a saleable price of each of the one or more parts 122 based on the estimated degradation degree of each of the one or more parts 122.

According to the present embodiment, the transaction mediation system 100 can monitor the degradation degree of each of the one or more parts 122 installed in the one or more vehicles 120. Thus, the owner 24 or the administrator 26 can extract the part matched with any condition by utilizing the transaction mediation system 100.

In addition, according to the present embodiment, the transaction mediation system 100 is configured to predict the saleable price according to the degradation degree of each of the parts. Thus, for example, when the owner 24 or the administrator 26 searches for the used part using the desired buying price as the key by utilizing the transaction mediation system 100, the owner 24 or the administrator 26 can extract the part appropriate to the price.

Furthermore, in accordance with the transaction mediation system 100 according to the present embodiment, based on an instruction from the owner 24 or the administrator 26 who desires to acquire the transfer of the used part, the transaction mediation server 180 is configured to extract the part 122 matched with the instruction among the one or more parts 122. For example, the transaction mediation server 180 obtains information indicating a request specification (which may be referred to as request specification information) of the used part from the communication terminal 30 of the owner 24 or the administrator 26, and extracts at least one part 122 matched with the request specification from among the one or more parts 122.

The transaction mediation server 180 notifies the owner 24 or the administrator 26 of an extraction result. In addition, the transaction mediation server 180 notifies the owner 22 of the extracted part 122 of information related to transaction (which may be referred to as transaction information) of the part.

According to the present embodiment, the transaction mediation system 100 can extract the part 122 matched with a condition desired by the owner 24 or the administrator 26 from among the one or more parts 122 installed in the one or more vehicles 120. For this reason, even when a part matched with the condition desired by the owner 24 or the administrator 26 is not on a used part market, the owner 24 or the administrator 26 can search for the desired part.

In addition, according to the present embodiment, the transaction mediation system 100 notifies the owner 22 of the extracted part 122 of the transaction information. Thus, the owner 22 of the above described part 122 may accept the transaction. When the owner 22 of the above described part 122 accepts the transaction, the owner 24 or the administrator 26 can acquire the part at the desired time.

[Outline of Elements Associated with Transaction Mediation System 100]

According to the present embodiment, the communication network 10 may be a wired communication transmission path, may be a wireless communication transmission path, or may be a combination of a wireless communication transmission path and a wired communication transmission path. The communication network 10 may include a wireless packet communication network, the Internet, a P2P network, a dedicated line, a VPN, an electric power communication line, an inter-vehicle communication line, a road-to-vehicle communication line, and the like. The communication network 10 (i) may include a mobile communication network such as a mobile phone line network and (ii) may include a wireless communication network such as a wireless MAN (for example, WiMAX (registered trademark)), a wireless LAN (for example, Wi-Fi (registered trademark)), Bluetooth (registered trademark), Zigbee (registered trademark), or near field communication (NFC).

According to the present embodiment, the owner 22 owns the vehicle 120. The owner 22 has a right for use, realization of revenue, or disposition of the vehicle 120. For example, the owner 22 can transfer the part 122 of the vehicle 120 to others. The owner 22 may be a natural person, may be a corporation, or may be an organization.

According to the present embodiment, the owner 24 owns the vehicle 140. The owner 24 has a right for use, realization of revenue, or disposition of the vehicle 140. For example, the owner 24 can replace the part 142 mounted to the vehicle 140 with the part 122 transferred from the owner 22. The owner 24 may be a natural person, may be a corporation, or may be an organization.

According to the present embodiment, the administrator 26 manages operations of the vehicle factory 160. For example, the administrator 26 manages progresses of various types of processes such as vehicle production, vehicle servicing, and vehicle repair. In addition, the administrator 26 manages inventory of feedstock, materials, or the like. The administrator 26 may be a natural person, may be a corporation, or may be an organization.

According to the present embodiment, the communication terminal 30 is utilized by the owner 22 or the owner 24 (which may be simply referred to as a user). The communication terminal 30 functions as an interface, for example, between the transaction mediation system 100 and each of users. The communication terminal 30 may be a device that can transmit and receive information with the transaction mediation server 180 via the communication network 10, and a detail thereof is not particularly limited. A personal computer, a mobile terminal, or the like can be exemplified as the communication terminal 30. A mobile phone, a smartphone, a PDA, a tablet, a notebook computer or a laptop computer, a wearable computer, or the like can be exemplified as the mobile terminal.

According to the present embodiment, the vehicle 120 moves while being loaded with an occupant and/or an article, and transports the occupant and/or the article. The vehicle 120 is configured by a plurality of the parts 122. The vehicle 120 may have an automated driving function, or may be an unmanned vehicle.

Examples of the vehicle 120 include a motor vehicle, a motorcycle, a bicycle, a standing ride vehicle having a power unit, a work machine, an electric train, and the like. Examples of the motor vehicle include a petrol vehicle, a fuel cell vehicle, an electric motor vehicle, a hybrid vehicle, a small commuter, an electric cart, a bus, and the like. Examples of the motorcycle include a motorbike, a three-wheel motorbike, and the like. Examples of the work machine include a forklift truck, a cultivator, a lawn mower, and the like. A detail of the vehicle 120 will be described below.

According to the present embodiment, the vehicle 140 moves while being loaded with an occupant and/or an article, and transports the occupant and/or the article. The vehicle 140 is configured by a plurality of the parts 142. The vehicle 140 may have a configuration similar to the vehicle 120. A detail of the vehicle 140 will be described below.

According to the present embodiment, in the vehicle factory 160, various types of works such as vehicle production, vehicle servicing, and vehicle repair are performed. For example, in the vehicle factory 160, the new vehicle 120 is manufactured utilizing the plurality of parts 122 detached from the plurality of vehicles 120.

In addition, for example, in the vehicle factory 160, the part 122 is detached from the vehicle 120. According to one embodiment, the part 122 detached from the vehicle 120 is delivered from the vehicle factory 160 to the owner 24. According to another embodiment, in the vehicle factory 160, the part 142 of the vehicle 140 is replaced with the part 122 detached from the vehicle 120.

According to still another embodiment, when a plurality of the owners 24 collectively acquire transfer of the single part 122, in the vehicle factory 160, the part 122 detached from the vehicle 120 may be further dismantled into a plurality of parts. The plurality of dismantled parts may be respectively delivered to the plurality of owners 24, or may replace the parts 142 of the vehicles 140 respectively owned by the plurality of owners 24. In addition, a part unnecessary for the plurality of owners 24 may be transferred to the vehicle factory 160.

According to the present embodiment, the production management system 162 manages the vehicle production. For example, the production management system 162 manages a specification of a raw material of the vehicle, and an input time and an input amount of the raw material into a production line.

According to the present embodiment, an inventory management system 164 manages an inventory of the raw material of the vehicle. The inventory management system 164 manages procurement of the raw material of the vehicle. The inventory management system 164 plans the procurement in such a way as to procure feedstock that satisfies the specification and the amount indicated by the production management system 162 by the time indicated by the production management system 162. The inventory management system 164 may procure various types of the parts 122 that are the raw materials of the vehicle by utilizing the transaction mediation server 180.

According to the present embodiment, the transaction mediation server 180 mediates the transaction of the part 122 between the one or more owner 22 and the one or more owners 24. The transaction mediation server 180 may mediate the transaction of the part 122 between the one or more owners 22 and the one or more administrators 26.

According to the present embodiment, the data obtaining unit 182 obtains, for example, information indicating the specification (which may be referred to as part specification information) of each of the one or more parts 122 installed in any of the one or more vehicles 120. The part specification information may be information in which identification information for identifying each of the one or more parts 122 (which may be referred to as a part ID) is associated with information indicating contents of the specification of each of the parts.

For example, the data obtaining unit 182 accesses the server managed or operated by a manufacturer or a dealer of each of the one or more vehicles 120, and obtains the part specification information of each of the parts. The data obtaining unit 182 may obtain the part specification information that is input to the communication terminal 30 by the owner 22 of the vehicle 120 equipped with each of the parts (which may be simply referred to as an owner of the part) from the communication terminal 30 of the owner 22 of each of the parts.

The data obtaining unit 182 obtains, for example, at least one of the movement history information indicating the movement history of each of the one or more vehicles 120, and the use history information indicating the use history of each of the one or more parts 122 installed in any of the one or more vehicles 120. The data obtaining unit 182 obtains at least one of the movement history information and the use history information, for example, from each of the one or more vehicles 120 via the communication network 10. The movement history information and/or the use history information may be information indicating measurement results by various types of sensors arranged (not illustrated) in each of the one or more vehicles 120.

The movement history may be a history related to at least one of a location, an acceleration, an angular acceleration, a vibration, a steering operation amount, an acceleration operation amount, a deceleration operation amount, and a weight on board. The movement history information may be information in which information indicating a clock time is associated with information indicating contents of each of the one or more items indicating the movement history. The use history may be a history related to a use amount or a use environment. The use history information may be information in which the information indicating the clock time is associated with information indicating contents of each of the one or more items indicating the use history. Examples of the use environment include a temperature, a humidity, and the like.

According to the present embodiment, the data storage unit 184 stores various types of data used for information processing in the transaction mediation server 180. For example, the data storage unit 184 stores the part specification information obtained by the data obtaining unit 182. The data storage unit 184 may store the movement history information obtained by the data obtaining unit 182. The data storage unit 184 may store the use history information obtained by the data obtaining unit 182.

In response to a request from the transaction mediation unit 186, the data storage unit 184 may extract information matched with a condition indicated by the request. The data storage unit 184 may output the extracted information to the transaction mediation unit 186.

According to the present embodiment, the transaction mediation unit 186 mediates the transaction of the part 122 between the one or more owners 22 and the one or more owners 24. The transaction mediation server 180 may mediate the transaction of the part 122 between the one or more owners 22 and the one or more administrators 26. A detail of the transaction mediation unit 186 will be described below.

[Specific Configuration of Each of the Units of Transaction Mediation System 100]

Each of the units of the transaction mediation system 100 may be realized by hardware, may be realized by software, or may be realized by a combination of hardware and software. Each of the units of the transaction mediation system 100 may be, at least partially, realized by a single server, or may be realized a plurality of servers. Each of the units of the transaction mediation system 100 may be, at least partially, realized on a virtual machine or a cloud system. Each of the units of the transaction mediation system 100 may be, at least partially, realized by a personal computer or a mobile terminal. A mobile phone, a smartphone, a PDA, a tablet, a notebook computer or a laptop computer, a wearable computer, or the like can be exemplified as the mobile terminal. Each of the units of the transaction mediation system 100 may store information utilizing a distributed ledger technology such as a blockchain or a distributed network.

When at least a part of component elements configuring the transaction mediation system 100 is realized by software, the component elements realized by the software may be realized by activating, in an information processing apparatus having a general configuration, software or a program defining operations related to the component elements. The above described information processing apparatus with the general configuration may include (i) a data processing apparatus having a processor such as a CPU or a GPU, a ROM, a RAM, a communication interface, or the like, (ii) an input apparatus such as a keyboard, a pointing device, a touch panel, a camera, a voice and sound input apparatus, a gesture input apparatus, various types of sensors, or a GPS receiver, (iii) an output apparatus such as a display apparatus, a voice and sound output apparatus, a vibration apparatus, and (iv) a storage device (including an external storage device) such as a memory, an HDD, or an SSD.

In the above described information processing apparatus with the general configuration, the above described data processing apparatus or storage device may store the above described software or program. The above described software or program causes, when executed by a processor, the above described information processing apparatus to execute operations defined by the software or the program. The above described software or program may be stored in a non-transitory computer readable recording medium. The above described software or program may be a program for causing a computer to function as the transaction mediation system 100 or a part thereof. The above described software or program may be a program for causing the computer to execute an information processing method in the transaction mediation system 100 or a part thereof.

According to one embodiment, an information processing method in each of the units of the transaction mediation system 100 is related to information processing for discriminating the vehicle 120. The above described information processing method is executed, for example, by a computer of the transaction mediation server 180.

The above described information processing method includes, for example, obtaining at least one of movement history information indicating a movement history of each of one or more movable objects, and use history information indicating a use history of each of one or more parts installed in any of the one or more movable objects. The above described information processing method includes, for example, estimating a degradation degree of each of the one or more parts based on at least one of the movement history indicated by the movement history information obtained in the obtaining and the use history indicated by the use history information obtained in the obtaining.

The owner 22 may be one example of an owner of a first part. The owner 24 may be one example of a transfer acquisition seeker. The administrator 26 may be one example of the transfer acquisition seeker. The transaction mediation system 100 may be one example of the information processing apparatus. The vehicle 120 may be one example of the movable object. The part 122 may be one example of the first part. The data obtaining unit 182 may be one example of the history obtaining unit. The data obtaining unit 182 may be one example of a part specification obtaining unit configured to obtain part specification information indicating a specification of a part. The data storage unit 184 may be one example of a storage unit. The transaction mediation unit 186 may be one example of the information processing apparatus. The transaction mediation unit 186 may be one example of a degradation estimation unit.

Figure 2:
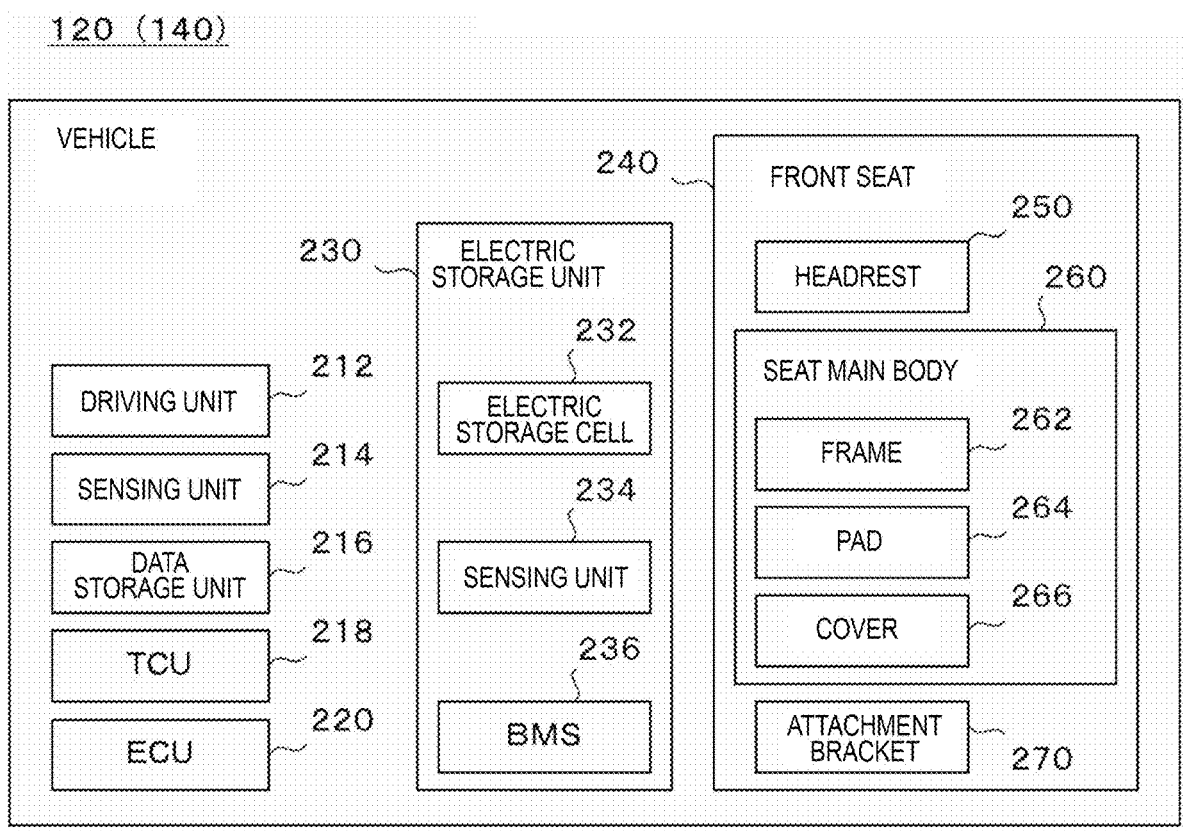
FIG. 2 schematically illustrates one example of an internal configuration of a vehicle 120.

FIG. 2 schematically illustrates one example of an internal configuration of the vehicle 120. It should be noted that an internal structure of the vehicle 140 may have a configuration similar to the internal structure of the vehicle 120. According to the present embodiment, the vehicle 120 includes a driving unit 212, a sensing unit 214, a data storage unit 216, a TCU 218, an ECU 220, an electric storage unit 230, and a front seat 240. According to the present embodiment, the electric storage unit 230 has an electric storage cell 232, a sensing unit 234, and a BMS 236. According to the present embodiment, the front seat 240 has a headrest 250, a seat main body 260, and an attachment bracket 270. According to the present embodiment, the seat main body 260 includes a frame 262, a pad 264, and a cover 266.

According to the present embodiment, the driving unit 212 moves the vehicle 120. For example, the driving unit 212 moves the vehicle 120 according to an instruction from the ECU 220.

According to the present embodiment, the sensing unit 214 obtains information related to at least one of a movement state and a use state of the vehicle 120. The sensing unit 214 outputs data related to various types of items associated with at least one of a movement state and a use state of the electric storage unit 230. According to one embodiment, the sensing unit 214 outputs information indicating a measurement value. According to another embodiment, when the measurement value exceeds a predetermined threshold, the sensing unit 214 outputs information indicating that the measurement value is higher than the predetermined threshold.

The sensing unit 214 may have one or more sensors. As the above described sensor, at least one of a positioning sensor configured to estimate its own location of the vehicle 120, an abnormality detection sensor configured to detect an abnormality that has occurred in the vehicle 120, a temperature sensor configured to measure a temperature of outside air of the vehicle 120, a humidity sensor configured to measure a humidity of the outside air of the vehicle 120, a temperature sensor configured to measure a temperature at a particular spot of an interior of the vehicle 120, a humidity sensor configured to measure a humidity at a particular spot of the interior of the vehicle 120, an acceleration sensor configured to measure an acceleration of the vehicle 120, an angular acceleration sensor configured to measure an angular acceleration of the vehicle 120, a vibrational sensor configured to measure a magnitude of a vibration of the vehicle 120, an inclination sensor configured to measure a magnitude of an inclination of the vehicle 120, an impact sensor configured to detect a magnitude of an impact applied to the vehicle 120, and a distance sensor configured to measure a movement distance of the vehicle 120 is exemplified. Examples of the positioning sensor include a GPS receiver, an acceleration sensor, a rotary encoder, and the like.

According to the present embodiment, the data storage unit 216 stores various types of information. For example, the data storage unit 216 stores data output by the sensing unit 214. The data storage unit 216 may store data output by the BMS 236 of the electric storage unit 230. The data output by the BMS 236 may be data output by the sensing unit 234.

According to the present embodiment, the TCU 218 transmits and receives various types of information, for example, with the transaction mediation server 180 via the communication network 10. The TCU 218 transmits, for example, the data output by the sensing unit 214 to the transaction mediation server 180 via the communication network 10. The TCU 218 may transmit the data output by the BMS 236 to the transaction mediation server 180 via the communication network 10.

According to the present embodiment, the ECU 220 controls an operation of each of the units of the vehicle 120. For example, the ECU 220 moves the vehicle 120 by controlling the driving unit 212. For example, the ECU 220 controls the TCU 218 to transmit at least one of the data output by the sensing unit 214 and the data output by the BMS 236 to the transaction mediation server 180.

According to the present embodiment, the electric storage unit 230 accumulates electric power supplied from the outside in the electric storage cell 232. The electric storage unit 230 supplies the electric power accumulated in the electric storage cell 232 to each of the units of the vehicle 120.

According to the present embodiment, the sensing unit 234 obtains information related to a use state of the electric storage unit 230. The sensing unit 234 outputs data related to various types of items associated with a use state of the electric storage unit 230. According to one embodiment, the sensing unit 234 outputs information indicating a measurement value. According to another embodiment, when the measurement value exceeds a predetermined threshold, the sensing unit 234 outputs information indicating that the measurement value is higher than the predetermined threshold.

The sensing unit 234 may have one or more sensors. Examples of the above described sensor include an acceleration sensor configured to measure an acceleration of the electric storage unit 230, an angular acceleration sensor configured to measure an angular acceleration of the electric storage unit 230, a vibrational sensor configured to measure a magnitude of a vibration of the electric storage unit 230, an inclination sensor configured to measure a magnitude of an inclination of the electric storage unit 230, an impact sensor configured to detect a magnitude of an impact of the electric storage unit 230, a voltage sensor configured to measure an output voltage of the electric storage unit 230, a current sensor configured to measure an output current of the electric storage unit 230, a voltage sensor configured to measure an input voltage of the electric storage unit 230, a current sensor configured to measure an input current of the electric storage unit 230, a charge cycle detection sensor configured to detect a charge cycle of the electric storage unit 230, an abnormality detection sensor configured to detect an abnormality of the electric storage unit 230, and the like. The number of times to perform charging or a charge frequency may be counted as one cycle from a discharge termination voltage to a charge termination voltage.

According to the present embodiment, the BMS 236 controls an operation of the electric storage unit 230. For example, the BMS 236 controls charge and discharge operations of the electric storage unit 230. The BMS 236 may control an storage operation of the data output by the sensing unit 234. For example, the BMS 236 (i) outputs the data output by the sensing unit 234 to the ECU 220 and (ii) requests the ECU 220 to store the data in the data storage unit 216.

According to the present embodiment, the front seat 240 is attached to a driver's seat and/or a front passenger's seat of the vehicle 120. The headrest 250 is arranged above the seat main body 260. The seat main body 260 holds an occupant of the vehicle 120. The frame 262 provides rigidity to the seat main body 260. The pad 264 is arranged on a surface on a side in contact with an occupant of the frame 262. The cover 266 covers the frame 262 and the pad 264. The attachment bracket 270 is arranged between the seat main body 260 and the vehicle 120, and is used to fix the seat main body 260 to the vehicle 120.

Each of elements configuring the vehicle 120 may be one example of the first part or a second part. The front seat 240 may be one example of the first part or the second part. The seat main body 260 may be one example of the first part or the second part. The frame 262 may be one example of the first part. The pad 264 may be one example of the first part. The cover 266 may be one example of the first part.

The data output by the sensing unit 214 may be one example of the movement history information of the vehicle 120. The data output by the sensing unit 214 may be one example of the use history information of the component element of the vehicle 120. The data output by the sensing unit 234 may be one example of the use history information of the electric storage unit 230.

FIG. 3 schematically illustrates one example of a data structure of a data table 300. The data table 300 may be one example of a data structure configuring a database for storing the part specification information of the part 122. The data table 300 is stored in the data storage unit 184, for example.

A single part may include a plurality of component parts that may be transaction objects. In view of the above, in accordance with the data table 300 according to the present embodiment, a hierarchical structure of the plurality of parts configuring the vehicle 120 is expressed. According to the present embodiment, the data table 300 stores a part ID 322, a parent part ID 324, a part name 332, a specification 334, a vehicle ID 342, an owner ID 344, a selling intention 352, and a desired selling price 354 while being associated with one another.

The part ID is, for example, identification information for identifying each of the parts. The parent part ID 324 is, for example, a part ID of another part (which may be referred to as a parent part) including each of the parts as a component part thereof.

Examples of the part name 332 include a general name, a common name, and the like of each of the parts. Examples of the specification 334 include a type, a manufacturer or a dealer, a model, a dimension, a weight, a rated value related to various types of physical properties and performances, and the like of each of the parts. The vehicle ID 342 is, for example, identification information for identifying each of the one or more vehicles 120 (which may be referred to as a vehicle ID). The owner ID 344 is, for example, identification information for identifying the owner 22 of each of the one or more vehicles 120.

The selling intention 352 indicates whether the owner of each of the parts has an intention to sell the part. Examples of the selling intention 352 include "present", "absent", "unknown", "partially present", "partially absent", and the like.

When a particular part includes the plurality of component parts that may be the transaction objects, the selling intention may be different for each of the component parts. In this case, "partially present" or "partially absent" may be input as the selling intention 352 for the particular part. The selling intention 352 may be one example of information indicating whether each of the parts can be sold. The desired selling price 354 indicates a desired price for the sale by the owner of each of the parts.

According to one embodiment, when the selling intention 352 of a parent part is "present", the selling intention 352 for a component part of the parent part is also regarded as "present". According to another embodiment, when the selling intention 352 for a parent part is "present" and the selling intention 352 for a component part of the parent part is "unknown", the selling intention 352 for the component part may be regarded as "present".

On the other hand, when the selling intention 352 for a parent part is "present", "absent" may be input as the selling intention 352 for a component part of the parent part. Even when the owner 22 of a particular part 122 has the intention to sell the particular part 122, it may be possible that the owner 22 does not have the intention to sell a stand-alone component part of the particular part 122. For example, even though the owner 22 of the front seat 240 has the intention to sell the whole of the front seat 240, it may be a case where the owner 22 does not have the intention to sell the headrest 250 alone or the cover 266 alone by taking handling of the rest of the parts into account.

For example, the part ID 322, the parent part ID 324, the part name 332, the specification 334, and the vehicle ID 342 are input by the manufacturer of the vehicle 120, for example, at the time of production or shipment of the vehicle 120. The part ID 322, the parent part ID 324, the part name 332, and the specification 334 may be provided by a server managed or operated by the manufacturer or the dealer. The owner ID 344 is input by the dealer of the vehicle 120, for example, at the time of sale of the vehicle 120. The owner ID 344 may be input by the owner 22 of the vehicle 120. The selling intention 352 and the desired selling price 354 are input by the owner 22 of the vehicle 120, for example.

According to the embodiment illustrated in FIG. 3, the part ID of the front seat is input as the parent part ID 324 of the headrest, the seat main body, and the attachment bracket. Thus, it is understood that the headrest, the seat main body, and the attachment bracket are component parts of the front seat. Similarly, the part ID of the seat main body is input as the parent part ID 324 of the frame, the pad, and the cover. Thus, it is understood that the frame, the pad, and the cover are component parts of the seat main body.

The selling intention 352 may be one example of sales availability information. The part for which the selling intention 352 is "present" may be one example of a part where the sales availability information indicates that its sale is available. The parent part may be one example of the second part.

FIG. 4 schematically illustrates one example of data structure of a data table 400. The data table 400 may be one example of a data structure configuring a database for storing the use history information of the part 122. The data table 400 is stored in the data storage unit 184, for example.

According to the present embodiment, the data table 400 stores a part ID 422, date and time 424, a use history 426, a degradation degree 432, a saleable price 434, and an alternative part 436 while being associated with one another. According to the present embodiment, information indicating date and time when the information indicating the use history is obtained is input as the date and time 424. Information indicating contents of each of one or more items indicating the use history is input as the use history 426.

According to the present embodiment, information indicating an extent of the degradation of the part 122 which is estimated by the transaction mediation unit 186 is input as the degradation degree 432. The extent of the degradation may be expressed by continuous numeric values, or may be expressed by gradual segmentations. According to the present embodiment, information indicating the saleable price of the part 122 which is predicted by the transaction mediation unit 186 is input as the saleable price 434.

According to the present embodiment, various types of information related to a part (which may be referred to as an alternative part) that may be attached, in place of the part 122, to the vehicle 120 equipped with the part 122 is input as the alternative part 436. Examples of the information related to the alternative part include a specification, a degradation degree, a price, and the like of the alternative part. Examples of the specification of the alternative part include a type, a manufacturer or a dealer, a model, a dimension, a weight, a rated value related to various types of physical properties or performances, and the like.

FIG. 5 schematically illustrates one example of a data structure of a data table 500. The data table 500 may be one example of a data structure configuring a database for storing the movement history information of the vehicle 120. The data table 500 is stored in the data storage unit 184, for example.

According to the present embodiment, the data table 500 stores a vehicle ID 522, date and time 524, and a movement history 526 while being associated with one another. According to the present embodiment, information indicating date and time when information indicating the movement history is obtained is input as the date and time 524. Information indicating contents of each of one or more items indicating the movement history is input as the movement history 526.

Figure 6:
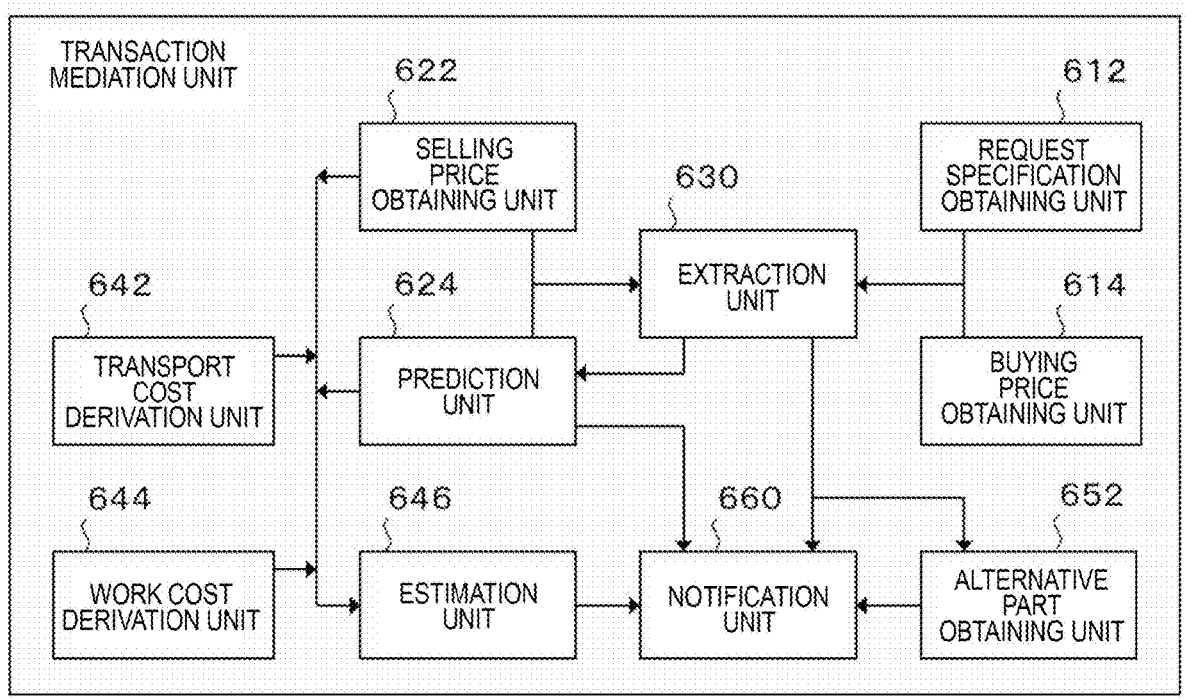
FIG. 6 schematically illustrates one example of an internal configuration of a transaction mediation unit 186.

FIG. 6 schematically illustrates one example of an internal configuration of the transaction mediation unit 186. According to the present embodiment, the transaction mediation unit 186 includes a request specification obtaining unit 612, a buying price obtaining unit 614, a selling price obtaining unit 622, a prediction unit 624, an extraction unit 630, a transport cost derivation unit 642, a work cost derivation unit 644, an estimation unit 646, an alternative part obtaining unit 652, and a notification unit 660.

According to the present embodiment, the request specification obtaining unit 612 obtains the above mentioned request specification information, for example, from the owner 24 or the administrator 26 who desires to acquire the transfer of the used part. According to one embodiment, the request specification obtaining unit 612 receives the request specification information transmitted by the communication terminal 30 of the owner 24. According to another embodiment, the request specification obtaining unit 612 receives the request specification information transmitted by the inventory management system 164.

According to the present embodiment, the buying price obtaining unit 614 obtains information indicating a desired buying price (which may be referred to as buying price information) of the owner 24 or the administrator 26 who desires to acquire the transfer of the used part. The desired buying price may be 0 Japanese Yen. According to one embodiment, the buying price obtaining unit 614 receives the buying price information transmitted by the communication terminal 30 of the owner 24. According to another embodiment, the buying price obtaining unit 614 receives the buying price information transmitted by the inventory management system 164.

According to the present embodiment, the selling price obtaining unit 622 obtains information indicating a desired selling price (which may be referred to as selling price information) of the part 122 from the owner 22 of the above described part 122 matched with a condition desired by the owner 24 or the administrator 26. The selling price obtaining unit 622 may receive the selling price information transmitted by the communication terminal 30 of the owner 22.

According to one embodiment, the owner 22 of the above described part 122 inputs and transmits the selling price information in response to reception of transaction information of which the notification unit 660 has notified. According to another embodiment, the owner 22 of the above described part 122 inputs and transmits the selling price information at timing at which the sale of the part 122 is desired irrespective of whether the transaction information of which the notification unit 660 has notified is received.

According to the present embodiment, the prediction unit 624 executes various types of prediction processing. For example, the prediction unit 624 predicts a saleable price of each of the one or more parts 122 or a saleable price of the particular part 122. The prediction unit 624 may predict the saleable price of the part 122 at the current time, or may predict the saleable price of the part 122 at a particular time in the future. A detail of the prediction unit 624 will be described below.

According to the present embodiment, the extraction unit 630 refers to the part specification information of the one or more parts 122 which is stored in the data storage unit 184, and extracts at least one of the parts 122 matched with the condition desired by the owner 24 or the administrator 26 among the one or more parts 122. The extraction unit 630 outputs the part ID of the extracted part 122 to at least one of the transport cost derivation unit 642, the work cost derivation unit 644, the estimation unit 646, the alternative part obtaining unit 652, and the notification unit 660.

According to one embodiment, the extraction unit 630 extracts at least one of the parts 122 matched with the specification indicated by the request specification information obtained by the request specification obtaining unit 612. According to another embodiment, the extraction unit 630 extracts at least one of the parts 122 matched with a condition that the saleable price or the desired selling price is lower than or equal to the desired buying price indicated by the buying price information obtained by the buying price obtaining unit 614. According to still another embodiment, at least one of the parts 122 is extracted which is (i) matched with the specification indicated by the request specification information obtained by the request specification obtaining unit 612 and also (ii) matched with a condition that the saleable price or the desired selling price is lower than or equal to the desired buying price indicated by the buying price information obtained by the buying price obtaining unit 614.

The extraction unit 630 may further extract the parent part of the part 122 matched the condition desired by the owner 24 or the administrator 26 (for example, the specification indicated by the request specification information). For example, first, the extraction unit 630 refers to the data table 300, and executes first extraction processing for extracting the part 122 matched with the above described condition. According to one embodiment, the extraction unit 630 extracts the part 122 matched with the above described condition from among the one or more parts 122 without taking into account the presence or absence of the selling intention of the owner 22. According to another embodiment, the extraction unit 630 extracts the part 122 matched with the above described condition from among the one or more parts 122 for which it is indicated that the owner 22 has a selling intention in the selling intention 352 of the data table 300.

When the part 122 matched with the above described condition is not extracted in the first extraction processing, according to one embodiment, the extraction unit 630 refers to the data table 300 and executes second extraction processing for extracting the parent part matched with the above described condition. The extraction unit 630 may extract the above described parent part from among the one or more parts 122 without taking into account the presence or absence of the selling intention of the owner 22. The extraction unit 630 may extract the above described parent part from among the one or more parts 122 for which it is indicated that the owner 22 has a selling intention in the selling intention 352 of the data table 300.

At this time, the extraction unit 630 may relax a part of the above described condition. For example, when the above described condition includes a condition related to the specification indicated by the request specification information and a condition related to the desired buying price indicated by the buying price information, the extraction unit 630 may extract the parent part using the condition related to the specification indicated by the request specification information as a new condition.

Thus, for example, even when the headrest 250 matched with the condition desired by the owner 24 or the administrator 26 is not extracted, the front seat 240 including the headrest 250 matched with the condition desired by the owner 24 or the administrator 26 may be extracted. When the parent part is extracted, the extraction unit 630 outputs information indicating the condition desired by the owner 24 or the administrator 26 and the part ID of the extracted parent part to the prediction unit 624. Thus, the prediction unit 624 can predict a saleable price of a part other than the part desired by the owner 24 or the administrator 26 which is, for example, the component part included in the extracted parent part.

In the first extraction processing, when the part 122 matched with the above described condition is not extracted, according to another embodiment, the extraction unit 630 may refer to the data table 300 and combine a plurality of component parts included in the plurality of parts to determine whether the part 122 matched with the above described condition is to be acquired. When the above described combination of the plurality of parts is discovered, the extraction unit 630 may output the above described combination of the plurality of parts as an extraction result.

For example, even when the degradation degree of the pad 264 of the first front seat 240 is not matched with the above described condition and the degradation degree of the headrest 250 of the second front seat 240 is not matched with the above described condition, for example, the front seat 240 matched with the above described condition is acquired by replacing the pad 264 of the first front seat 240 with the pad 264 of the second front seat 240. In view of the above, the extraction unit 630 outputs at least one of, for example, (i)

a combination of the front seat 240 and the pad 264 of the second front seat 240, (ii) a combination of the front seat 240 and the seat main body 260 of the second front seat 240, and (iii) a combination of the front seat 240 and the second front seat 240 as the extraction result. It should be noted that the combination of the plurality of parts is not limited to the above described combinations.

At this time, the extraction unit 630 may relax a part of the above described condition. For example, when the above described condition includes the condition related to the specification indicated by the request specification information and the condition related to the desired buying price indicated by the buying price information, the extraction unit 630 may extract the above described combination of the plurality of parts using the condition related to the specification indicated by the request specification information as a new condition.

According to the present embodiment, the transport cost derivation unit 642 derives a cost (which may be referred to as a transport cost) for transporting each of the one or more parts 122 stored in the data table 300 or the particular part 122 to a location designated by the owner 24 or the administrator 26 described above. The transport cost derivation unit 642 may derive the above described transport cost based on a location of the movable object equipped with each of the parts. The transport cost derivation unit 642 determines the location of the above described movable object by referring to the information stored in the movement history 526 of the data table 500, for example.

The transport cost derivation unit 642 may derive the above described transport cost based on the location of the movable object equipped with each of the parts, a dimension and a weight of each of the parts, and a predetermined transport fee table. The transport fee table defines a relationship between a dimension of an article that is a transport object, a weight of the article, and a transport distance, and a transport fee. The transport cost derivation unit 642 determines the dimension and the weight of each of the parts by referring to the information stored in the specification 334 of the data table 300, for example.

According to one embodiment, for example, when the condition desired by the owner 24 or the administrator 26 includes an item related to the transport cost, the transport cost derivation unit 642 derives the above described transport cost for each of the one or more parts 122 stored in the data table 300. According to another embodiment, the transport cost derivation unit 642 obtains the part ID of at least one of the parts 122 (for example, the above described component part or the parent part) extracted by the extraction unit 630 from the extraction unit 630. The transport cost derivation unit 642 derives the above described transport cost for each of the above described single part 122.

According to the present embodiment, the work cost derivation unit 644 derives a work cost of each of the one or more parts 122 stored in the data table 300 or the particular part 122. The work cost derivation unit 644 derives the above described work cost based on a predetermined fee table for each type of the parts, for example. As the work cost, at least one of a cost of detachment work for detaching the above described part 122 from the vehicle 120 of the owner 22, and a cost of attachment work for attaching the above described part 122 to the vehicle 140 of the owner 24 is exemplified.

According to one embodiment, for example, when the condition desired by the owner 24 or the administrator 26 includes an item related to the work cost, the work cost derivation unit 644 derives the above described work cost for each of the one or more parts 122 stored in the data table 300. According to another embodiment, the work cost derivation unit 644 obtains the part ID of at least one of the parts 122 (for example, the above described component part or the parent part) extracted by the extraction unit 630 from the extraction unit 630. The work cost derivation unit 644 derives the above described work cost for each of the above described single part 122.

According to the present embodiment, the estimation unit 646 estimates a cost (which may be referred to as an acquisition cost) for the owner 24 or the administrator 26 to acquire the desired part or its parent part. The estimation unit 646 estimates the above described acquisition cost based on, for example, (i) the desired selling price of the above described part which is obtained by the selling price obtaining unit 622 or the saleable price of the above described part which is predicted by the prediction unit 624, (ii) the transport cost derived by the transport cost derivation unit 642, and (iii) the work cost derived by the work cost derivation unit 644. The estimation unit 646 may estimate a total of (i) the desired selling price of the above described part which is obtained by the selling price obtaining unit 622 or the saleable price of the above described part which is predicted by the prediction unit 624, (ii) the transport cost derived by the transport cost derivation unit 642, and (iii) the work cost derived by the work cost derivation unit 644 as the above described acquisition cost.

According to the present embodiment, the alternative part obtaining unit 652 obtains the part ID of at least one of the parts 122 (for example, the above described component part or the parent part) extracted by the extraction unit 630 from the extraction unit 630. The above mentioned alternative part is determined with regard to each of at least one of the parts 122 extracted by the extraction unit 630. Examples of the alternative part include (i) another part that is of a type identical or similar to the extracted part and is attachable to the vehicle 120, (ii) another part that is of a type identical or similar to the extracted part, has a quality or a grade approximately equal to the extracted part or superior to the extracted part, and is attachable to the vehicle 120, and the like.

The alternative part obtaining unit 652 obtains various types of information related to the above described alternative part. The alternative part obtaining unit 652 may access a server managed or operated by the manufacturer or the dealer of the alternative part and obtain the above described information. Examples of the information related to the alternative part include the specification, the degradation degree, the price, and the like of the alternative part as mentioned above. Examples of the specification of the alternative part include the type, the manufacturer or the dealer, the model, the dimension, the weight, the rated value related to various types of physical properties or performances, and the like.

According to the present embodiment, the notification unit 660 notifies the owner 24 or the administrator 26 described above of the extraction result of the extraction unit 630. The above described notification may include information indicating at least one of the saleable price, the desired selling price, the transport cost, and the work cost of the extracted part 122. The above described notification may include information indicating an estimate price calculated by the estimation unit 646 with regard to each of the one or more extracted parts 122.

In addition, according to the present embodiment, when the extraction unit 630 has extracted the part 122 matched with the above described condition (or a part thereof), the notification unit 660 may notify the owner 22 of the part 122 extracted by the extraction unit 630 of the above mentioned transaction information. The transaction information includes at least one of, for example, (i) information related to the presence or absence of the transfer acquisition seeker of the extracted part 122, (ii) information related to the desired buying price indicated by the buying price information, and (iii) information related to the alternative part. The transaction information may further include information related to a transport cost derived by a transport cost calculation unit.

The transaction information may include information indicating the estimation result of the current degradation degree of the extracted part 122. The transaction information may include information indicating a transaction record (for example, a transaction price) in the past of the part equivalent to the extracted part 122. The transaction information may include information indicating the prediction result of the transaction price in the future of the extracted part 122.

Figure 7:
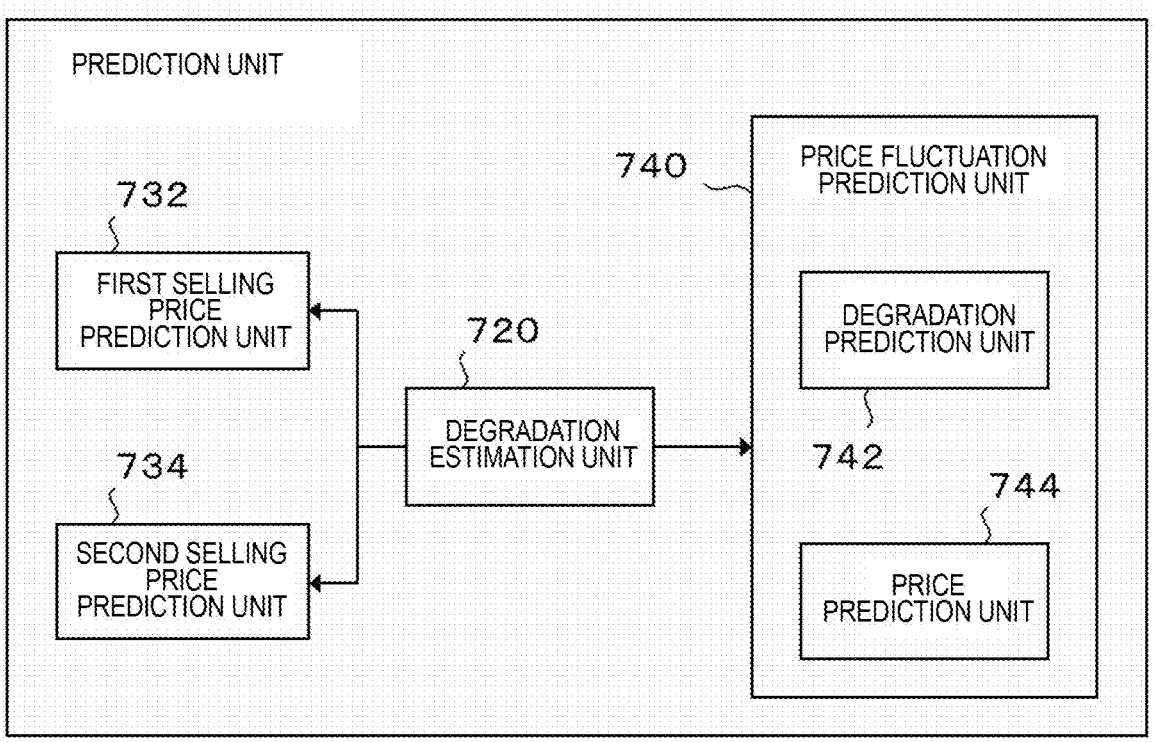
FIG. 7 schematically illustrates one example of an internal configuration of a prediction unit 624.

FIG. 7 schematically illustrates one example of an internal configuration of the prediction unit 624. According to the present embodiment, the prediction unit 624 includes a degradation estimation unit 720, a first selling price prediction unit 732, a second selling price prediction unit 734, and a price fluctuation prediction unit 740. According to the present embodiment, the price fluctuation prediction unit 740 has a degradation prediction unit 742 and a price prediction unit 744.

According to the present embodiment, the degradation estimation unit 720 estimates a degradation degree of each of the one or more parts 122. For example, the degradation estimation unit 720 refers to the data storage unit 184 and obtains at least one of the use history information of each of the parts and the movement history information of the vehicle 120 equipped with each of the parts. In addition, the degradation estimation unit 720 estimates the degradation degree of each of the parts based on at least one of the use history indicated by the above described use history information and the movement history indicated by the movement history information.

An indicator indicating a degradation degree of a part may be appropriately chosen according to a type of the part. An estimation method of a degradation degree may be appropriately chosen according to a type of the indicator indicating the degradation degree. As the estimation method of the degradation degree, any method in related art or any method to be developed in the future may be adopted. For example, the degradation degree of the part is derived by using a function in which (i) the indicator indicating the degradation degree of the part is set as an objective variable, and (ii) at least one of one or more items included in the movement history and one or more items included in the use history is set as an explanatory variable. For example, the degradation degree of the part is derived by using a learning model for outputting the degradation degree of the part while at least one of the one or more items included in the movement history and the one or more items included in the use history are used as an input. The above described learning model is produced by machine learning for estimating a value of the indicator indicating the degradation degree of the part, for example, from at least one of the one or more items included in the movement history and the one or more items included in the use history.

The degradation degree of the part is determined, for example, by an extent of fatigue of the part or a reduction degree of performance or strength of the part. The degradation degree of the part may be expressed by continuous numeric values, or may be expressed by gradual segmentations. The degradation degree of the part is set, for example, based on at least one of a magnitude and an amount of load applied to the part. Examples of the above described load include thermal load, mechanical load, electromagnetic load, electrical load, chemical load, and the like. The degradation degree of the part may be set by a combination of various types of load.

While a predetermined time is set as a starting point, the degradation degree of the part may be set based on at least one of (i) a total amount of the load applied to the part, (ii) a total amount of the load higher than a predetermined value out of the load applied to the part, (iii) a total length of a time period during which the load higher than the predetermined value is applied, and (iv) the number of times to apply the load higher than the predetermined value. Examples of the predetermined time include (i) a time when the part is manufactured, shipped, or sold, (ii) a time when the part is mounted to the movable object, (iii) a time when use of the part is initially started, (iv) a time when the part is reused to resume the use of the part, and the like.

According to one embodiment, a rate, relative to a length of a period of time between the time when the use of the part is started and the time when the degradation degree is calculated, of a total of a length of the time period during which the load higher than the predetermined value is applied is calculated as the degradation degree of the part. According to another embodiment, based on the length of the period of time between the time when the use of the part is started and the time when the degradation degree is calculated and the number of times to apply the load higher than the predetermined value during the period of time, a frequency (the number of times/unit time period) at which the load higher than the predetermined value is applied during the period of time is calculated. The above described frequency may be used as the degradation degree of the part.

It should be noted that in any period of time, the degradation degree of the part may be determined based on at least one of (i) the total amount of the load applied to the part, (ii) the total amount of the load higher than the predetermined value out of the load applied to the part, (iii) the total length of the time period during which the load higher than the predetermined value is applied, and (iv) the number of times to apply the load higher than the predetermined value. Examples of the starting point of the above described period of time include (i) the time when the part is manufactured, shipped, or sold, (ii) the time when the part is mounted to the movable object, (iii) the time when use of the part is initially started, (iv) the time when the part is reused to resume the use of the part, and the like. Examples of an ending point of the above described period of time include (i) a time when the use of the part is lastly stopped, (ii) a time when the part is detached from the movable object, (iii) a time when the degradation degree of the part is calculated, and the like.

For example, when the part is a motor, a stator section of the motor is degraded. In view of the above, the degradation degree of the motor may be estimated or determined, for example, by total heat load during a use period of the motor. The total heat load of the motor is estimated or calculated, for example, based on a total use time period of the motor, (ii) a total of a time period when a torque is higher than a predetermined value out of the use time period of the motor, or the like. The above described total heat load may be one example of the indicator indicating the degradation degree of the motor. The above described total heat load may be one example of the indicator representing the extent of the fatigue of the motor.

For example, when the part is a storage battery, a progress degree of the degradation is different depending on a type, a use environment, and a use situation of the storage battery. The use environment of the storage battery may be one example of the thermal load or the mechanical load. The use situation of the storage battery may be one example of the chemical load or the electrical load. In view of the above, for example, the degradation degree of the storage battery may be estimated or determined by the total number of cycles in a use period of the storage battery or the total use time period. The degradation degree of the storage battery may be estimated or determined by a reduction degree of performance of the storage battery. For example, the degradation degree of the storage battery may be estimated or determined by SOH of the storage battery. In addition, in recent years, for example, various types of methods have been developed for evaluating or estimating a degradation of the performance or a remaining life of the storage battery in a relatively short time period by analyzing a charge-discharge behavior of the storage battery. It should be noted that the indicator indicating the degradation degree of the storage battery may be determined by the type of the storage battery.

According to the present embodiment, the first selling price prediction unit 732 predicts the saleable price with regard to each of the one or more parts 122 included in the data table 300 or each of the one or more parts 122 extracted by the extraction unit 630. For example, the first selling price prediction unit 732 predicts the above described saleable price based on the degradation degree of each of the parts which is estimated by the degradation estimation unit 720.

As a method for predicting the selling price from the degradation degree of the part, any method in related art or any method to be developed in the future may be adopted. For example, the selling price of the particular part is determined based on a sales record of the part of the same type in the past. The sales record may be a set of information in which with regard to each of one or more parts where buying and selling are concluded, a type of the part, a degradation degree of the part, and a selling price of the part are associated with one another. Thus, the first selling price prediction unit 732 can predict the saleable price of the part based on the type of the part that is a prediction target and the degradation degree of the part. According to one embodiment, the first selling price prediction unit 732 derives a function in which (i) the saleable price of the part is set as an objective variable and (ii) the type and the degradation degree of the part are set as explanatory variables by using the above described sales record. The first selling price prediction unit 732 predicts the saleable price of the part by using the above described function. According to another embodiment, the first selling price prediction unit 732 derives a learning model by machine learning for estimating the saleable price of the part from the type and the degradation degree of the part by using the above described sales record. The first selling price prediction unit 732 derives the saleable price of the part from the type and the degradation degree of the part that is a prediction target by using the above described learning model.

According to the present embodiment, the second selling price prediction unit 734 predicts, from the part 122 extracted as the parent part of another part 122, the saleable price after the other part 122 is detached. For example, the second selling price prediction unit 734 predicts the saleable price with regard to each of the remaining one or more component parts. The second selling price prediction unit 734 predicts the saleable price of the part that is the prediction target by a method similar to the first selling price prediction unit 732, for example.

According to the present embodiment, the price fluctuation prediction unit 740 predicts a price fluctuation in the future with regard to each of the one or more parts 122 included in the data table 300 or each of the one or more parts 122 extracted by the extraction unit 630. As a prediction method of the future price fluctuation, any method in related art or any method to be developed in the future may be adopted. For example, the price fluctuation prediction unit 740 predicts the future price fluctuation of the part based on the future degradation degree of the part that is the prediction target. The price fluctuation prediction unit 740 may predict the future price fluctuation of the part based on the past price fluctuation of the part that is the prediction target.

According to the present embodiment, the degradation prediction unit 742 predicts the future degradation degree, for example, with regard to each of the one or more parts 122 extracted by the extraction unit 630. The degradation prediction unit 742 predicts the future degradation degree of the part based on the current degradation degree of the part 122 which is estimated by the degradation estimation unit 720.

As the prediction method of the future degradation degree, any method in related art or any method to be developed in the future may be adopted. For example, the degradation prediction unit 742 predicts the future degradation degree of the part based on a progress situation of the past degradation degree of the part that is the prediction target. The degradation prediction unit 742 may derive a function for predicting the future degradation degree based on record data indicating a progress situation of the past degradation degree of the part that is the prediction target. The degradation prediction unit 742 may derive a learning model by machine learning for predicting the future degradation degree from the record data indicating the progress situation of the past degradation degree of the part that is the prediction target. The degradation prediction unit 742 may predict the future degradation degree of the particular part by using the function or the learning model described above.

According to the present embodiment, the price prediction unit 744 predicts the future saleable price with regard to each of the one or more parts 122 extracted by the extraction unit 630, for example. The price prediction unit 744 predicts the future saleable price based on the future degradation degree of the part 122 which is predicted by the degradation prediction unit 742.

As a prediction method of the future saleable price, any method in related art or any method to be developed in the future may be adopted. The price prediction unit 744 predicts the future saleable price of the part that is the prediction target by a method similar to the first selling price prediction unit 732, for example.

Figure 8:
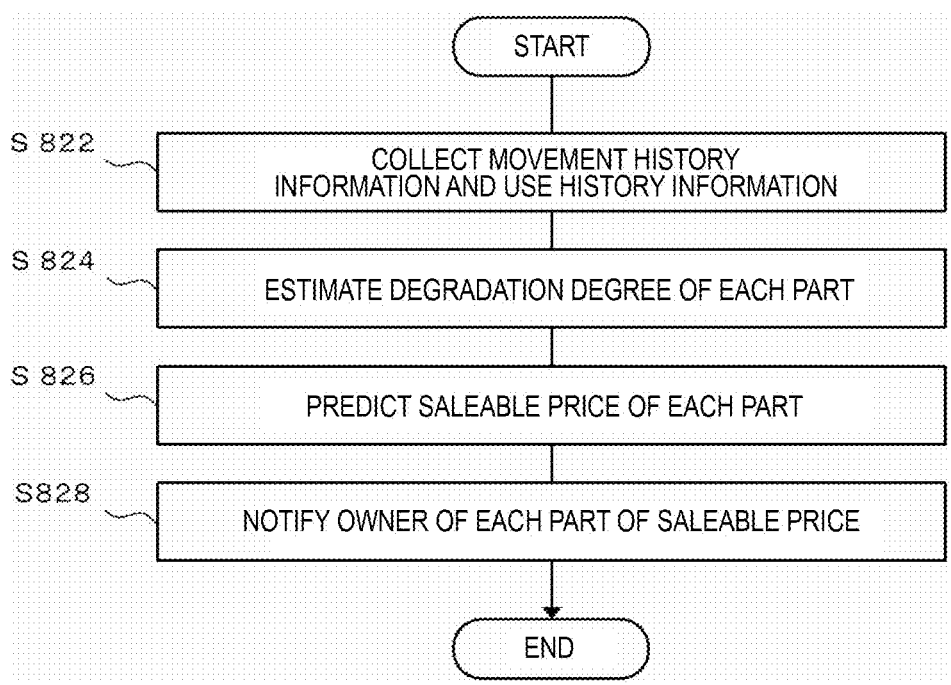
FIG. 8 schematically illustrates one example of information processing in the transaction mediation system 100.

FIG. 8 schematically illustrates one example of information processing in the transaction mediation system 100. According to the present embodiment, first, in step 822 (step may be abbreviated as S), the data obtaining unit 182 collects movement history information of each vehicle from each of the one or more vehicles 120. In addition, the data obtaining unit 182 collects use history information of each of the one or more parts 122 installed in each vehicle from each of the one or more vehicles 120. The data obtaining unit 182 stores the collected movement history information and the collected use history information in the data storage unit 184.

Next, in S824, the degradation estimation unit 720 estimates the degradation degree with regard to each of the above described one or more parts 122 or at least a part of the above described one or more parts 122. The degradation estimation unit 720 estimates the degradation degree of each of the parts based on at least one of the movement history information and the use history information which have been collected by the data obtaining unit 182, for example. The degradation estimation unit 720 stores an estimation result of the degradation degree of each of the parts in the data storage unit 184.

Next, in S826, the first selling price prediction unit 732 predict the saleable price with regard to each of the above described one or more parts 122 or at least a part of the above described one or more parts 122. The first selling price prediction unit 732 predicts the saleable price of each of the parts based on, for example, the degradation degree of each of the parts. The first selling price prediction unit 732 stores a prediction result of the saleable price of each of the parts in the data storage unit 184.

Subsequently, in S828, the notification unit 660 notifies the owner 22 of each of the parts of information indicating the prediction result of the saleable price of each of the parts. Thus, the owner 22 is prompted to register information such as the selling intention or the desired selling price in the transaction mediation system 100.

Figure 9:
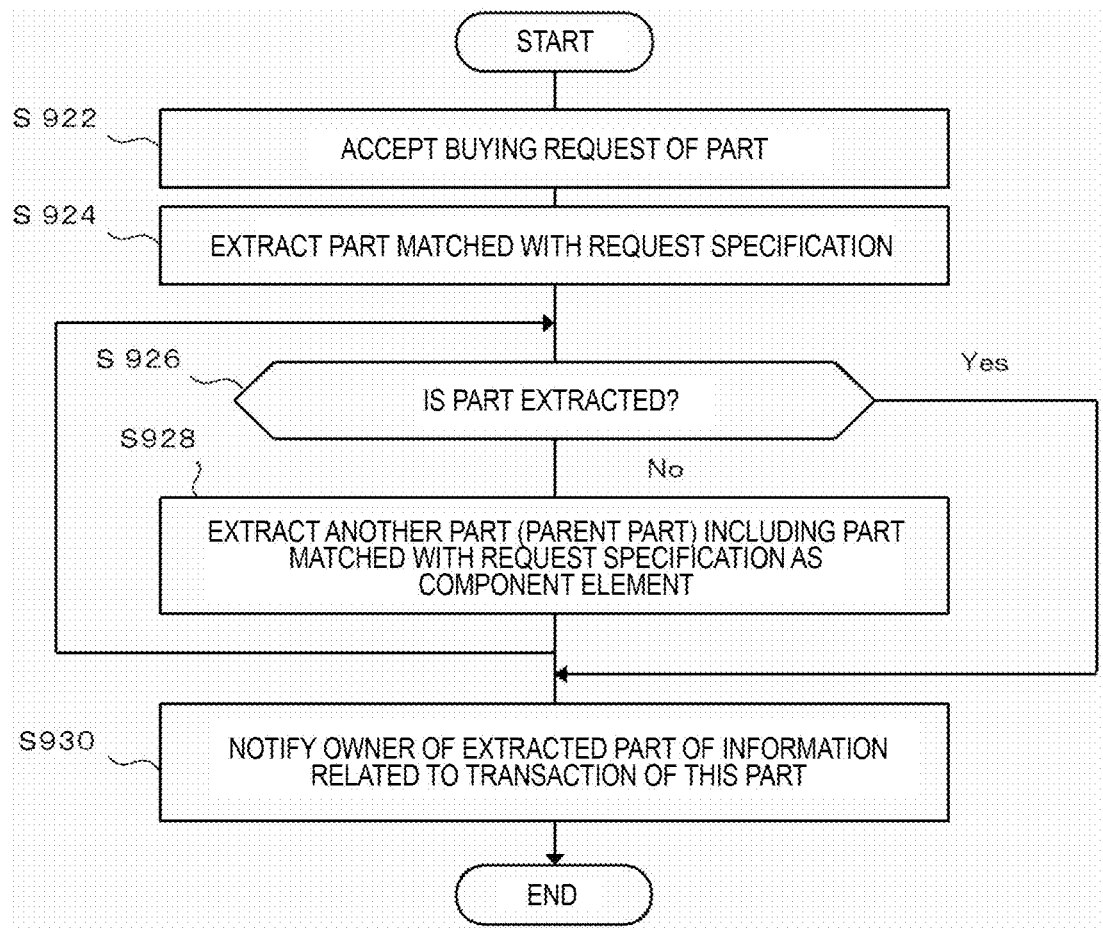
FIG. 9 schematically illustrates one example of the information processing in the transaction mediation system 100.

FIG. 9 schematically illustrates one example of the information processing in the transaction mediation system 100. According to the present embodiment, first, in S922, the transaction mediation unit 186 accepts a buying request of a particular part from the owner 24 or the administrator 26 who desires to buy a used part. Specifically, the request specification obtaining unit 612 receives the request specification information. In addition, the buying price obtaining unit 614 receives the buying price information.

Next, in S924, the extraction unit 630 extracts the part 122 matched with the specification indicated by the request specification information described above. At this time, the extraction unit 630 may extract the part 122 that satisfies both the condition related to the specification indicated by the above described request specification information and the condition related to the buying price indicated by the above described buying price information.

Next, when the extraction unit 630 does not extract the one or more parts 122 (in the case of No in S926), the extraction unit 630 extracts another part including the part 122 matched with the specification indicated by the request specification information described above. Subsequently, the determination processing in S926 is repeated.

On the other hand, when the extraction unit 630 extracts the one or more parts 122 (in the case of Yes in S926), in S930, the notification unit 660 notifies the owner 22 of the extracted part 122 of the transaction information. The processing is thus ended.

Figure 10:
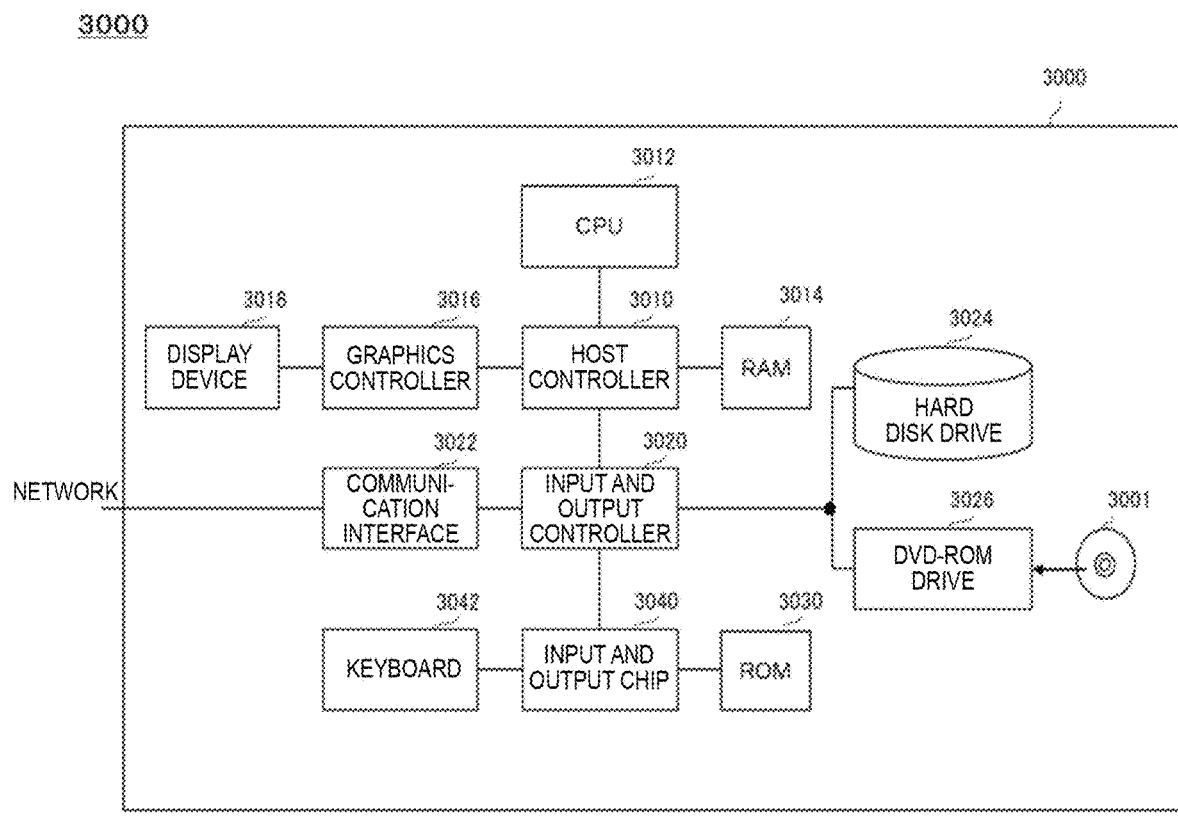
FIG. 10 schematically illustrates one example of a system configuration of a computer 3000.

FIG. 10 schematically illustrates one example of a computer 3000, in which a plurality of embodiments of the present invention may be entirely or partly realized. For example, at least a part of the transaction mediation server 180 is realized by the computer 3000. For example, at least a part of the TCU 218 is realized by the computer 3000. For example, at least a part of the ECU 220 is realized by the computer 3000. For example, at least a part of the BMS 236 is realized by the computer 3000.

A program installed in the computer 3000 can cause the computer 3000 to perform an operation associated with an apparatus according to the embodiment of the present invention or to function as one or more "units" of the apparatus, or cause the computer 3000 to perform the operation or the one or more units thereof, and/or cause the computer 3000 to perform processes of the embodiment of the present invention or steps thereof. Such a program may be executed by the CPU 3012 to cause the computer 3000 to perform particular operations associated with some or all of the blocks of flowcharts and block diagrams described in the present specification.

The computer 3000 according to the present embodiment includes a CPU 3012, a RAM 3014, a GPU 3016, and a display device 3018, which are mutually connected by a host controller 3010. The computer 3000 also includes an input and output unit such as a communication interface 3022, a hard disk drive 3024, a DVD-ROM drive 3026, and an IC card drive, which are connected to the host controller 3010 via the input and output controller 3020. The computer also includes legacy input and output units such as a ROM 3030 and a keyboard 3042, which are connected to the input and output controller 3020 through an input and output chip 3040.

The CPU 3012 operates according to programs stored in the ROM 3030 and the RAM 3014, thereby controlling each of the units. The GPU 3016 acquires image data generated by the CPU 3012 on a frame buffer or the like provided in the RAM 3014 or in itself, and causes the image data to be displayed on a display device 3018.

The communication interface 3022 communicates with other electronic devices via a network. The hard disk drive 3024 stores a program and data that are used by the CPU 3012 in the computer 3000. The DVD-ROM drive 3026 reads the program or the data from the DVD-ROM 3001, and provides the hard disk drive 3024 with the program or the data via the RAM 3014. The IC card drive reads the program and data from the IC card, and/or writes the program and data to the IC card.

The ROM 3030 stores therein a boot program or the like that is performed by the computer 3000 at the time of activation, and/or a program depending on the hardware of the computer 3000. The input and output chip 3040 may also connect various input and output units to the input and output controller 3020 via a parallel port, a serial port, a keyboard port, a mouse port, or the like.

A program is provided by a computer readable storage medium, such as the DVD-ROM 3001 or the IC card. The program is read from the computer readable storage medium, installed into the hard disk drive 3024, RAM 3014, or ROM 3030, which are also examples of the computer readable storage medium, and performed by the CPU 3012. The information processing described in these programs is read into the computer 3000, resulting in cooperation between the programs and the above described various types of hardware resources. An apparatus or method may be constituted by realizing the operation or processing of information in accordance with the use of the computer 3000.

For example, when communication is performed between the computer 3000 and an external device, the CPU 3012 may execute a communication program loaded onto the RAM 3014 to instruct the communication interface 3022 to perform communication processing based on the processing described in the communication program. The communication interface 3022, under the control of the CPU 3012, reads the transmission data stored in the transmission buffer area provided in the recording medium such as the RAM 3014, the hard disk drive 3024, the DVD-ROM 3001, or the IC card, and sends the read transmission data to the network or writes reception data received from the network to the reception buffer area or the like provided on the recording medium.

In addition, the CPU 3012 may cause all or a necessary portion of a file or a database to be read into the RAM 3014, the file or the database having been stored in an external recording medium such as the hard disk drive 3024, the DVD-ROM drive 3026 (the DVD-ROM 3001), the IC card, etc. and perform various types of processing on the data on the RAM 3014. The CPU 3012 may then write back the processed data to the external recording medium.

Various types of information, such as various types of programs, data, tables, and databases, may be stored in the recording medium to undergo information processing. The CPU 3012 may perform various types of processing on the data read from the RAM 3014, which includes various types of operations, information processing, condition judging, conditional branch, unconditional branch, search/replacement of information, etc. as described throughout this disclosure and designated by an command sequence of programs, and writes the result back to the RAM 3014. In addition, the CPU 3012 may search for information in a file, a database, etc. in the recording medium. For example, when a plurality of entries, each having an attribute value of a first attribute associated with an attribute value of a second attribute, are stored in the recording medium, the CPU 3012 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above explained program or software modules may be stored in the computer readable storage medium on the computer 3000 or near the computer 3000. In addition, a recording medium such as a hard disk or a RAM provided in a server system connected to a dedicated communication network or the Internet can be used as the computer readable storage medium, thereby providing the program to the computer 3000 via the network.

While the embodiments of the present invention have been described, the technical scope of the present invention is not limited to the above described embodiments. It is apparent to persons skilled in the art that various alterations or improvements can be added to the above described embodiments. In addition, the matters described with regard to the particular embodiment can be applied to other embodiments with a range without causing technical contradictions. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 communication network, 22 owner, 24 owner, 26 administrator, 30 communication terminal, 100 transaction mediation system, 120 vehicle, 122 part, 140 vehicle, 142 part, 160 vehicle factory, 162 production management system, 164 inventory management system, 180 transaction mediation server, 182 data obtaining unit, 184 data storage unit, 186 transaction mediation unit, 212 driving unit, 214 sensing unit, 216 data storage unit, 218 TCU, 220 ECU, 230 electric storage unit, 232 electric storage cell, 234 sensing unit, 236 BMS, 240 front seat, 250 headrest, 260 seat main body, 262 frame, 264 pad, 266 cover, 270 attachment bracket, 300 data table, 322 part ID, 324 parent part ID, 332 part name, 334 specification, 342 vehicle ID, 344 owner ID, 352 selling intention, 354 desired selling price, 400 data table, 422 part ID, 424 date and time, 426 use history, 432 degradation degree, 434 saleable price, 436 alternative part, 500 data table, 522 vehicle ID, 524 date and time, 526 movement history, 612 request specification obtaining unit, 614 buying price obtaining unit, 622 selling price obtaining unit, 624 prediction unit, 630 extraction unit, 642 transport cost derivation unit, 644 work cost derivation unit, 646 estimation unit, 652 alternative part obtaining unit, 660 notification unit, 720 degradation estimation unit, 732 first selling price prediction unit, 734 second selling price prediction unit, 740 price fluctuation prediction unit, 742 degradation prediction unit, 744 price prediction unit, 3000 computer, 3001 DVD-ROM, 3010 host controller, 3012 CPU, 3014 RAM, 3016 GPU, 3018 display device, 3020 input and output controller, 3022 communication interface, 3024 hard disk drive, 3026 DVD-ROM drive, 3030 ROM, 3040 input and output chip, 3042 keyboard

What is claimed is:

1. An information processing apparatus comprising:
a communication interface;
at least one processor; and
a memory, wherein
the communication interface is configured to obtain, through a communication network, at least one of movement history information indicating a movement history of each of one or more movable objects and use history information indicating a use history of each of one or more parts installed in any of the one or more movable objects;
the at least one processor is configured to estimate a current or future degradation degree of each of the one or more parts based on at least one of the movement history indicated by the movement history information obtained by the communication interface and the use history indicated by the use history information obtained by the communication interface;
the communication interface is further configured to obtain request specification information indicating a specification requested for a used part by a transfer acquisition seeker who desires to acquire transfer of the used part;
the at least one processor is further configured to
refer to part specification information indicating a specification of each of the one or more parts, stored in the memory and the estimated current or future degradation degree, and
extract, from among the one or more parts, a first part matched with the specification indicated by the request specification information obtained by the communication interface; and
the communication interface is further configured to notify, when a part matched with the specification indicated by the request specification information has been extracted, an owner of the first part of transaction information related to transaction of the first part.

2. The information processing apparatus according to claim 1, wherein
the movement history is a history related to at least one of a location, an acceleration, an angular acceleration, a vibration, a steering operation amount, an acceleration operation amount, a deceleration operation amount, and a weight on board.

3. The information processing apparatus according to claim 2, wherein,
the at least one processor is further configured to predict a saleable price of each of the one or more parts based on the estimated degradation degree of each of the one or more parts.

4. The information processing apparatus according to claim 1, wherein,
the at least one processor is further configured to predict a saleable price of each of the one or more parts based on the estimated degradation degree of each of the one or more parts.

5. The information processing apparatus according to claim 1, wherein
the communication interface is further configured to perform at least one of (i) obtaining buying price information indicating a desired buying price of the transfer acquisition seeker, and (ii) obtaining information related to an alternative part to be attached, in place of the first part, to a movable object equipped with the first part, and
the transaction information includes at least one of (i) information related to presence or absence of the transfer acquisition seeker of the first part, (ii) information related to the desired buying price indicated by the buying price information, and (iii) information related to the alternative part.

6. The information processing apparatus according to claim 5, wherein
the at least one processor is further configured to derive a transport cost of the first part based on a location of the movable object equipped with the first part which is indicated by the movement history information obtained by the communication interface, and
the transaction information further includes information related to the transport cost derived by the transport cost derivation unit.

7. The information processing apparatus according to claim 6, wherein
the at least one processor is further configured to
obtain selling price information indicating a desired selling price of the owner of the first part;
derive a work cost of at least one of detachment work and attachment work of the first part; and
estimate a cost for the transfer acquisition seeker to acquire the first part based on the obtained desired selling price of the first part, the derived transport cost, and the derived work cost.

8. The information processing apparatus according to claim 1, wherein
the at least one processor is configured to further extract a second part including the first part as a component part thereof.

9. The information processing apparatus according to claim 8, wherein
the at least one processor is further configured to execute first extraction processing for extracting the first part, and
when the first part is not extracted by the first extraction processing, execute second extraction processing for extracting the second part.

10. The information processing apparatus according to claim 9, wherein
the at least one processor is further configured to predict a saleable price of the second part from which the first part is detached.

11. The information processing apparatus according to claim 8, wherein further comprising:
the at least one processor is further configured to predict a saleable price of the second part from which the first part is detached.

12. The information processing apparatus according to claim 1, wherein
the at least one processor is further configured to (i) predict a future degradation degree based on the estimated degradation degree of the first part and (ii) predict a future saleable price based on the future degradation degree.

13. A non-transitory computer readable medium having recorded thereon a program that, when executed by a computer, causes the computer to execute:
obtaining, through a communication network, at least one of movement history information indicating a movement history of each of one or more movable objects and use history information indicating a use history of each of one or more parts installed in any of the one or more movable objects;
estimating a current or future degradation degree of each of the one or more parts based on at least one of the movement history indicated by the movement history information obtained in the obtaining and the use history indicated by the use history information obtained in the obtaining;
obtaining request specification information indicating a specification requested for a used part by a transfer acquisition seeker who desires to acquire transfer of the used part;
referring to part specification information indicating a specification of each of the one or more parts, stored in a memory and the estimated current or future degradation degree, and extracting, from among the one or more parts, a first part matched with the specification indicated by the request specification information obtained by the obtaining request specification information; and
notifying, when a part matched with the specification indicated by the request specification information has been extracted, an owner of the first part of transaction information related to transaction of the first part.

14. An information processing method comprising:
obtaining, through a communication network, at least one of movement history information indicating a movement history of each of one or more movable objects and use history information indicating a use history of each of one or more parts installed in any of the one or more movable objects; and
estimating a current or future degradation degree of each of the one or more parts based on at least one of the movement history indicated by the movement history information obtained in the obtaining and the use history indicated by the use history information obtained in the obtaining;

obtaining request specification information indicating a specification requested for a used part by a transfer acquisition seeker who desires to acquire transfer of the used part;

referring to part specification information indicating a specification of each of the one or more parts, stored in a storage unit and the estimated current or future degradation degree, and extracting, from among the one or more parts, a first part matched with the specification indicated by the request specification information obtained by the obtaining request specification information; and notifying, when a part matched with the specification indicated by the request specification information has been extracted, an owner of the first part of transaction information related to transaction of the first part.

* * * * *